United States Patent
Kadam et al.

(10) Patent No.: US 11,207,620 B2
(45) Date of Patent: Dec. 28, 2021

(54) FILTER PORT SEAL

(71) Applicant: Cummins Filtration IP, Inc., Columbus, IN (US)

(72) Inventors: Pravin S. Kadam, Kolhapur (IN); Wassern Abdalla, Cookeville, TN (US); Manolito D. Mendoza, Cookeville, TN (US); Peter K. Herman, Stoughton, WI (US); Kevin C. South, Cookeville, TN (US); Ismail C. Bagci, Cookeville, TN (US); Deeksha Shukla, Hardoi (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 277 days.

(21) Appl. No.: 15/755,206

(22) PCT Filed: Aug. 29, 2016

(86) PCT No.: PCT/US2016/049191
§ 371 (c)(1),
(2) Date: Feb. 26, 2018

(87) PCT Pub. No.: WO2017/040367
PCT Pub. Date: Mar. 9, 2017

(65) Prior Publication Data
US 2019/0076762 A1    Mar. 14, 2019

Related U.S. Application Data

(60) Provisional application No. 62/212,065, filed on Aug. 31, 2015.

(51) Int. Cl.
*B01D 35/16* (2006.01)
*B01D 35/15* (2006.01)
(Continued)

(52) U.S. Cl.
CPC ............ *B01D 35/16* (2013.01); *B01D 29/21* (2013.01); *B01D 35/153* (2013.01)

(58) Field of Classification Search
CPC ....... B01D 35/16; B01D 29/21; B01D 35/153
See application file for complete search history.

(56) References Cited

U.S. PATENT DOCUMENTS

| 4,497,714 A | 2/1985 | Harris |
| 4,502,955 A | 3/1985 | Schaupp |

(Continued)

FOREIGN PATENT DOCUMENTS

| CN | 1611290 | 5/2005 |
| CN | 104797317 | 7/2015 |

(Continued)

OTHER PUBLICATIONS

Office Action from corresponding CN Application No. 2016800484399, dated Jul. 17, 2019, pp. 1-6.
(Continued)

*Primary Examiner* — Waqaas Ali
(74) *Attorney, Agent, or Firm* — Foley & Lardner LLP

(57) ABSTRACT

A filter assembly includes a drain port comprising a top portion and at least one surface modification along the top portion. The drain port defines an aperture therein and is alignable with an outlet port. The outlet port includes a seal member that is attachable to an end portion of the outlet port. A portion of the aperture of the drain port is sealable to the seal member when the drain port and the outlet port are aligned such that the at least one surface modification of the drain port does not abut the seal member of the outlet port, thereby creating a sealed connection between the drain port and the outlet port.

21 Claims, 8 Drawing Sheets

(51) Int. Cl.
*B01D 29/21* (2006.01)
*B01D 35/153* (2006.01)

(56) References Cited

U.S. PATENT DOCUMENTS

| | | | |
|---|---|---|---|
| 4,619,764 | A | 10/1986 | Church et al. |
| 5,089,129 | A | 2/1992 | Brigman |
| 5,548,893 | A | 8/1996 | Koelfgen |
| 5,606,989 | A * | 3/1997 | Roll .................. B01D 17/00 137/203 |
| 6,139,738 | A | 10/2000 | Maxwell |
| 6,409,804 | B1 | 6/2002 | Cook et al. |
| 6,706,181 | B1 | 3/2004 | Baumann et al. |
| 6,835,305 | B1 | 12/2004 | Baumann et al. |
| 6,936,169 | B2 | 8/2005 | Baumann et al. |
| 7,237,681 | B2 | 7/2007 | Brieden et al. |
| 7,527,739 | B2 | 5/2009 | Jiang et al. |
| 8,673,138 | B2 | 3/2014 | Braunheim |
| 9,108,125 | B2 | 8/2015 | Braunheim |
| 9,205,355 | B2 | 12/2015 | Deschamps et al. |
| 9,333,448 | B2 | 5/2016 | Braunheim et al. |
| 9,810,373 | B2 | 11/2017 | Braunheim |
| 10,035,090 | B2 | 7/2018 | Kollmann et al. |
| 10,279,289 | B2 | 5/2019 | Braunheim et al. |
| 2002/0036163 | A1 * | 3/2002 | Miller .................. F02M 37/24 210/248 |
| 2005/0072719 | A1 * | 4/2005 | Sakata .................. B01D 35/153 210/97 |
| 2005/0274664 | A1 | 12/2005 | Stoehr et al. |
| 2007/0034560 | A1 | 2/2007 | Janik et al. |
| 2007/0084776 | A1 | 4/2007 | Sasur |
| 2007/0240390 | A1 | 10/2007 | Becker et al. |
| 2008/0024719 | A1 | 1/2008 | Kamishita et al. |
| 2009/0008321 | A1 | 1/2009 | Tanner et al. |
| 2010/0000930 | A1 | 1/2010 | Ahuja et al. |
| 2011/0017649 | A1 | 1/2011 | Sasur |
| 2011/0089091 | A1 | 4/2011 | Grass et al. |
| 2015/0115184 | A1 | 4/2015 | Allott et al. |

FOREIGN PATENT DOCUMENTS

| | | | |
|---|---|---|---|
| CN | 104797317 A * | 7/2015 | ........... B01D 35/147 |
| DE | 19951085 | 10/1999 | |
| DE | 10308427 | 2/2003 | |
| DE | 10 2005 000 658 | 1/2005 | |
| DE | 10 2005 015 194 | 4/2005 | |
| DE | 20 2006 006 084 | 4/2006 | |
| DE | 20 2006 017 305 | 11/2006 | |
| DE | 10 2007 009 352 | 2/2007 | |
| DE | 10 2007 048 550 | 10/2007 | |
| EP | 0260069 | 3/1988 | |
| EP | 0 385 113 | 9/1990 | |
| EP | 0 405 447 | 1/1991 | |
| EP | 1 233 173 | 8/2002 | |
| EP | 1 695 753 | 8/2006 | |
| WO | WO-2006/105755 | 10/2006 | |
| WO | WO-2009/080455 | 7/2009 | |

OTHER PUBLICATIONS

International Search Report and Written Opinion issued for PCT/US2016/049191, dated Nov. 7, 2016, 8 pages.

* cited by examiner

FILTER PORT SEAL

CROSS-REFERENCE TO RELATED PATENT APPLICATIONS

This application is a National Stage of PCT Application No. PCT/US2016/049191, filed Aug. 29, 2016, which claims priority to and the benefit of U.S. Provisional Patent Application No. 62/212,065, filed on Aug. 31, 2015. The contents of both applications are incorporated herein by reference in their entirety and for all purposes.

FIELD

The present application relates generally to surface modifications for use with filter assemblies.

BACKGROUND

A drain port of a filter housing of a filter assembly may be configured to attach to an outlet port with a radial o-ring seal member of a filter element to allow a fluid to drain from the filter element.

SUMMARY

Various embodiments provide for a filter assembly that includes a drain port comprising a top portion and at least one surface modification along the top portion. The drain port defines an aperture therein and is alignable with an outlet port. The outlet port includes a seal member that is attachable to an end portion of the outlet port. A portion of the aperture of the drain port is sealable to the seal member of the outlet port when the drain port and the outlet port are aligned such that the at least one surface modification of the drain port does not abut the seal member of the outlet port, thereby creating a sealed connection between the drain port and the outlet port.

Another embodiment provides for a filter assembly that includes a first port and a second port. The first port includes a top portion and at least one surface modification along the top portion. The first port defines an aperture therein. The second port includes a seal member and an end portion. The seal member is attachable to an end portion of the second port. The first port and the second port are alignable with each other. A portion of the aperture of the first port is sealable to the seal member of the second port when the first port and the second port are aligned such that the at least one surface modification of the first port does not abut the seal member of the second port, thereby creating a sealed connection between the first port and the second port.

Yet another embodiment provides for a filter assembly that includes a housing and a filter element. The housing includes a drain port that includes a top portion and at least one surface modification along the top portion. The drain port defines an aperture therein. The filter element is positionable within the housing and includes a filter media and an outlet port. The outlet port includes a seal member and an end portion. The seal member is attachable to the end portion of the outlet port. The drain port and the outlet port are alignable with each other. A portion of the aperture of the drain port is sealable to the seal member of the outlet port when the drain port and the outlet port are aligned such that the at least one surface modification of the drain port does not abut the seal member of the outlet port, thereby creating a sealed connection between the drain port and the outlet port.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Figure 1B:
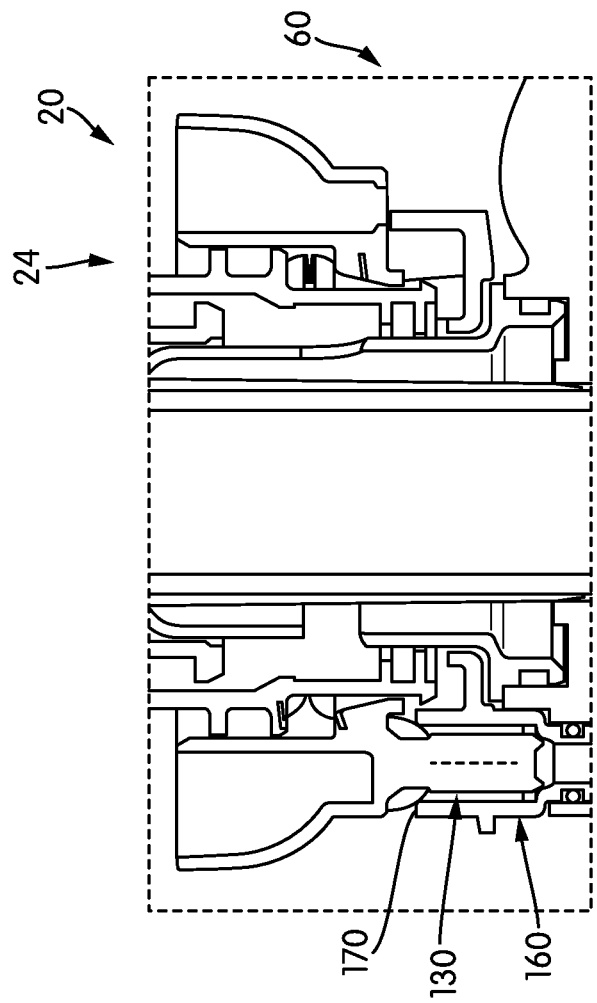
FIG. 1B is an enlarged view of a portion of FIG. 1A.

Referring to the figures generally, various embodiments disclosed herein relate to a drain port with at least one surface modification to prevent unauthorized outlet ports (e.g., of unauthorized filters) from sealing to the drain port.
The Filter Assembly FIGS. 1A-2B show a filter assembly 20 according to one embodiment. The filter assembly 20 includes a housing 60 and a filter element 70. A portion of a filter assembly 20 according to another embodiment is shown in FIG. 3. The filter assembly 20 may be used for various types of fluid filtration (e.g., fuel or oil filtration).

The housing 60 is configured to contain, surround or house the filter element 70 and includes an upper housing portion 62 and a lower housing portion 64 that are attachable to each other in order to secure the filter element 70 within the housing 60. The housing 60 further includes a drain port 160 with at least one surface modification 170 (as shown, for example, in FIGS. 4-10 and as described further herein).

The filter element 70 is positionable and securable within the housing 60 and is configured to filter a fluid. Accordingly, the filter element 70 includes a filter media 76 for filtration. The filter element 70 may further include a top endplate 72 and a bottom endplate 74 positioned on either end of the filter media 76 for support and structure. The filter element 70 also includes an outlet port, as described further herein. The outlet port may be either an authorized outlet port 30 (as shown in FIG. 3) or an unauthorized outlet port 130 (as shown in FIG. 1A-2B). As used herein, the term "unauthorized" refers to an outlet port 30 (and/or corresponding filter element 70), which is not authorized for operation within the housing 60. The authorized outlet port 30 includes a seal member, such as an o-ring seal member 82, that is attachable or connectable to an end portion of the outlet port 30. The o-ring seal member 82 may sealingly attach the drain port 160 of the housing 60 and the end portion of the authorized outlet port 30 of the filter element 70 together and may create a sealed connection.

Figure 2B:
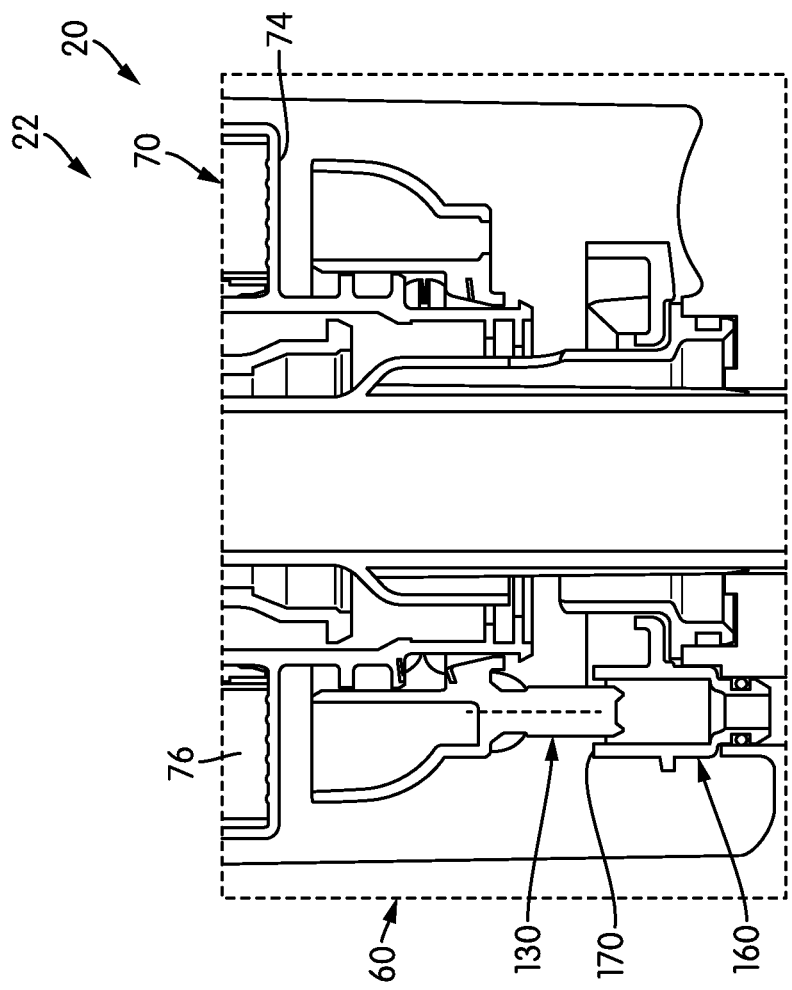
FIG. 2B is an enlarged view of a portion of FIG. 2A
Figure 2A:
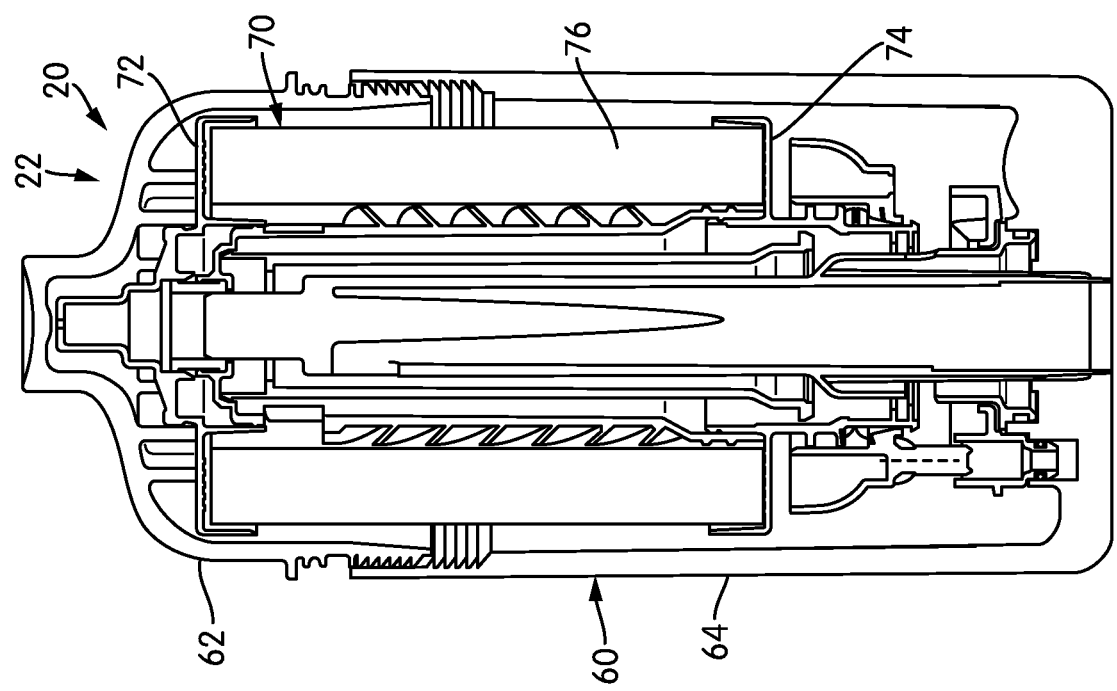
FIG. 2A is a cross-sectional view of the filter assembly of FIG. 1A in an open position.
Figure 3:
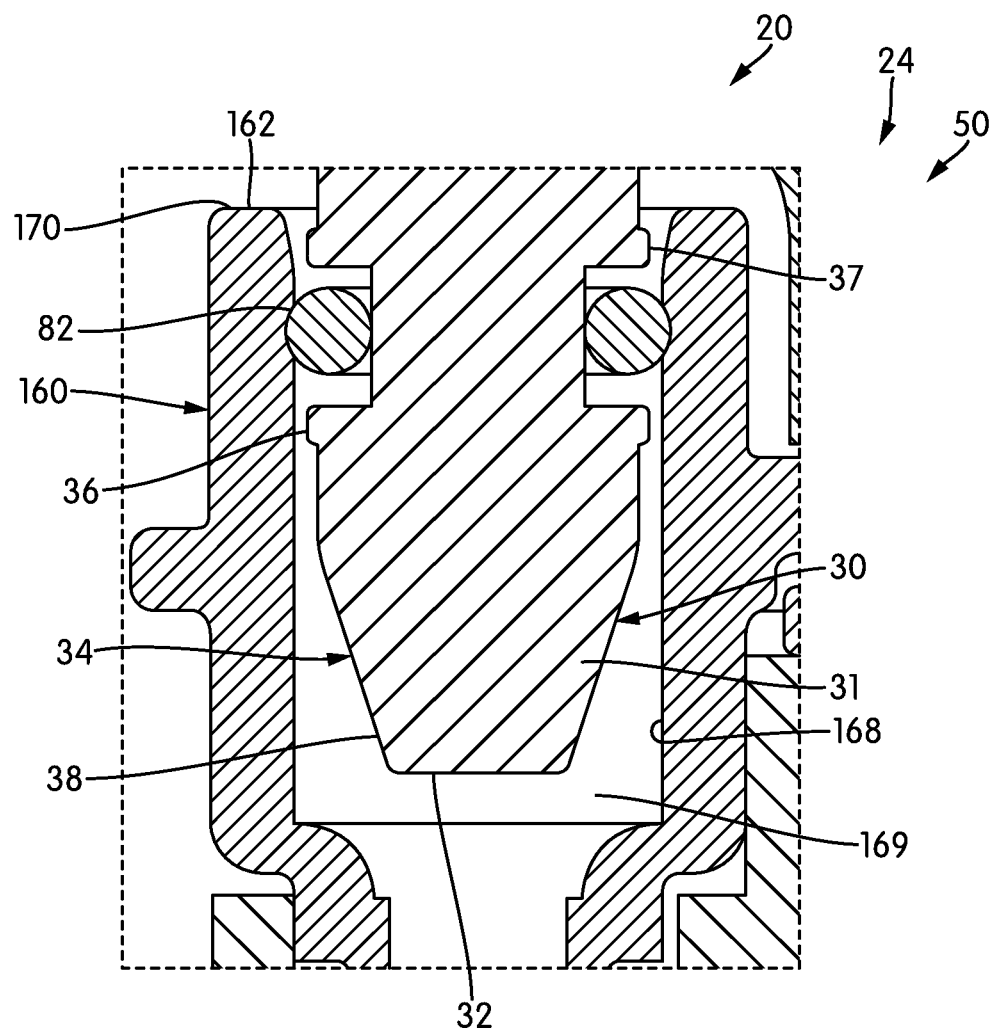
FIG. 3 is a cross-sectional view of a portion of a filter assembly with a drain port according to one embodiment.

In order to assemble the filter assembly 20, the filter element 70 is positioned within one of the upper housing portion 62 and the lower housing portion 64 in an open position 22 (as shown in FIGS. 2A-2B). In the open position 22, the upper housing portion 62 and the lower housing portion 64 are not completely attached to each other such that the unauthorized outlet port 130 (or the authorized outlet port 30) is not yet engaged with the drain port 160.

Figure 1A:
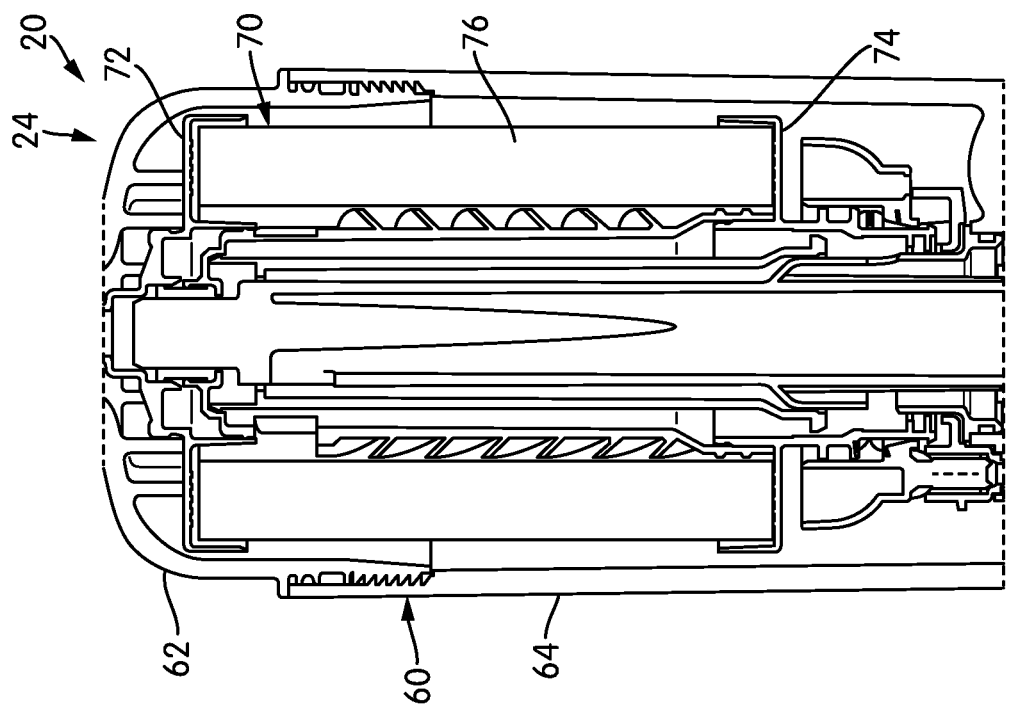
FIG. 1A is a cross-sectional view of a filter assembly in a closed position according to one embodiment.

The upper housing portion 62 and the lower housing portion 64 may then be attached to each other (through, for example, a threaded connection). As the upper housing portion 62 and the lower housing portion 64 are attached to each other, the filter element 70 is moved further into the housing 60, engaging the unauthorized outlet port 130 (or the authorized outlet port 30) with the drain port 160 in the closed position 24 (as shown in FIGS. 1A-1B and 3). If the filter element 70 includes an authorized outlet port 30 (as shown in FIG. 3), a sealed connection is created between the drain port 160 and the outlet port 30 (as described further herein). If the filter element 70 includes an unauthorized outlet port 130 (as shown in FIGS. 1A-1B), a sealed connection is not created between the drain port 160 and the unauthorized outlet port 130 due to the surface modifications 170 on the drain port 160 (as described further herein).

The Drain Port

The first port or drain port 160 of the housing 60 provides an area with an aperture 169 that the fluid to be drained can flow through. For example, the drain port 160 may be used to drain fluid from within the filter assembly 20. The aperture 169 may extend through the drain port 160. Accordingly, the drain port 160 further provides an exit or outlet out of the filter assembly 20 and may lead to, for example, a reservoir or container. The drain port 160 may further be configured to align with and connect or seal with a second port or outlet port 30. Although the outlet port 30 is shown as an outlet and the drain port 160 is shown as a drain, it is understood that the outlet port 30 may instead be an inlet port and the drain port 160 may instead be an inlet.

As shown in FIG. 3, the o-ring seal member 82 of the outlet port 30 may seal to the inside or inner surface 168 that is defined by the aperture 169 of the drain port 160 to create the sealed connection 50 between the drain port 160 and the outlet port 30. Accordingly, when the drain port 160 and the outlet port 30 are sealingly connected, one of the drain port 160 and the outlet port 30 may extend into the other of the drain port 160 and the outlet port 30. As shown in FIG. 3, the outlet port 30 extends within the aperture 169 of the drain port 160 to allow the o-ring seal member 82 of the outlet port 30 to seal with the inner surface 168 of the aperture 169 of the drain port 160.

The drain port 160 may include a sealing area, lip, face, or top portion 162. The top portion 162 of the drain port 160 refers to the end of the drain port 160 and includes the endmost surface of the drain port 160. The drain port 160 may incorporate one or more different surface modifications 170 along the top portion 162 of the drain port 160. According to one embodiment, the surface modifications 170 may be used to prevent or inhibit certain types of unauthorized outlet ports 130 of filter assemblies, such as those of particular unauthorized filter assemblies that may be introduced as an after-market product, from securely or effectively sealing to the drain port 160. The unauthorized outlet ports 130 do not seal to the portion of the drain port 160 that does not have the surface modifications 170. For example, the unauthorized outlet ports 130 do not seal to the inner surface 168 of the aperture 169 of the drain port 160 and do not have the o-ring seal member 82. Instead, the unauthorized outlet port 130 may have a face seal member 40 (as described further herein).

The surface modifications 170 may prevent unauthorized outlet ports 130 that do not include an o-ring seal member 82 (and instead include certain types of seal members, such as a face seal member 40 (as described further herein)) from securely or effectively sealing to the top portion 162 of the drain port 160. More specifically, the surface modifications 170 may create gaps between the top portion 162 of the drain port 160 and the face seal member 40 of the unauthorized outlet port 130. Accordingly, the surface modifications 170 may provide a standardized control to only prevent certain unauthorized outlet ports 130 from sealing with the drain port 160 and allow certain outlet ports 30 to seal with the drain port 160. Conversely, since the surface modifications 170 are only along the top portion 162 of the drain port 160, the drain port 160 may still sealingly connect with an outlet port 30 that includes an o-ring seal member 82 since the o-ring seal member 82 is configured to connect to the inner surface 168 of the aperture 169, rather than the top portion 162 of the drain port 160 where the surface modification 170 are. The surface modifications 170 may include, but are not limited to, notches 172, ribs, grooves, cuts, recessed areas, extensions, projections, protrusions 174, zig-zags, a wavy pattern, textures, and/or surface roughness 176.

Figure 4:
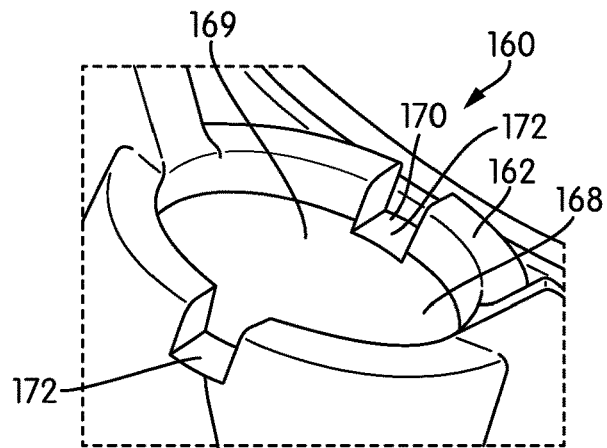
FIG. 4 is a perspective view of a drain port according to one embodiment.
Figure 5:
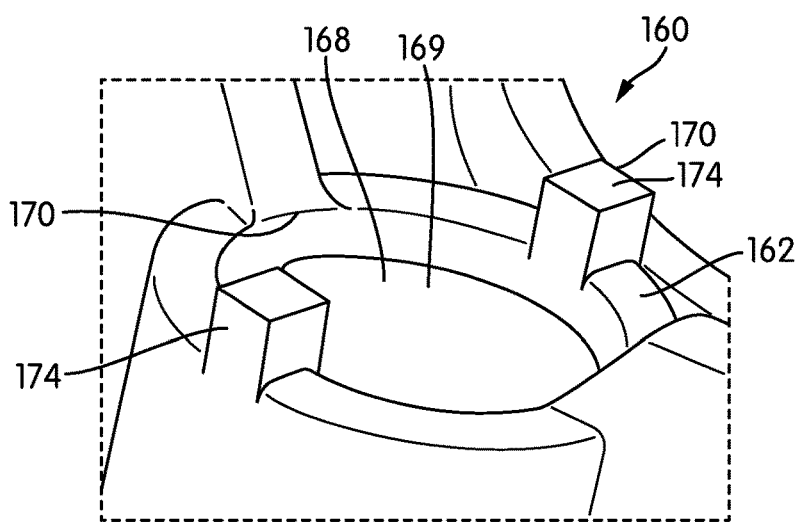
FIG. 5 is a perspective view of a drain port according to another embodiment.
Figure 6:
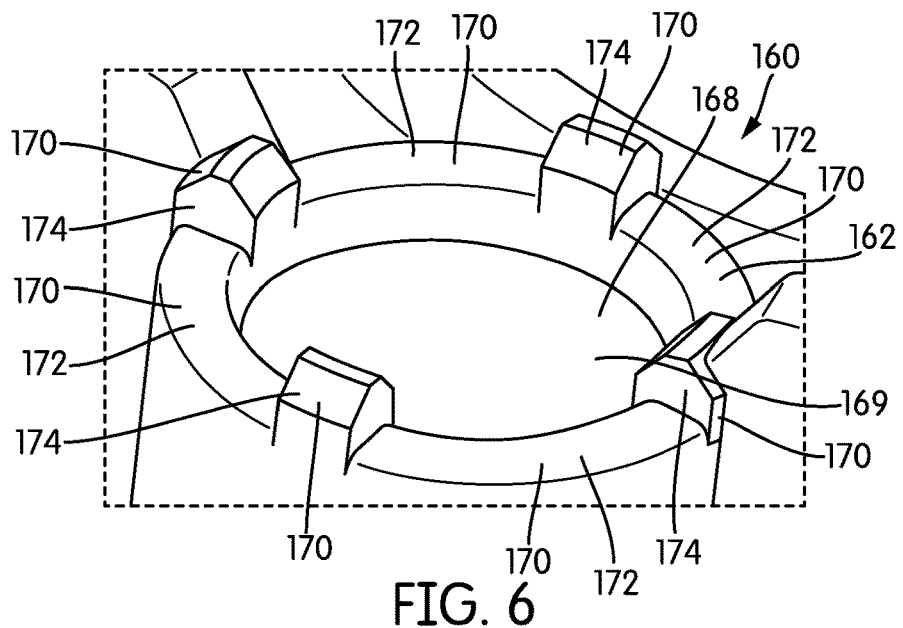
FIG. 6 is a perspective view of a drain port according to yet another embodiment.
Figure 7:
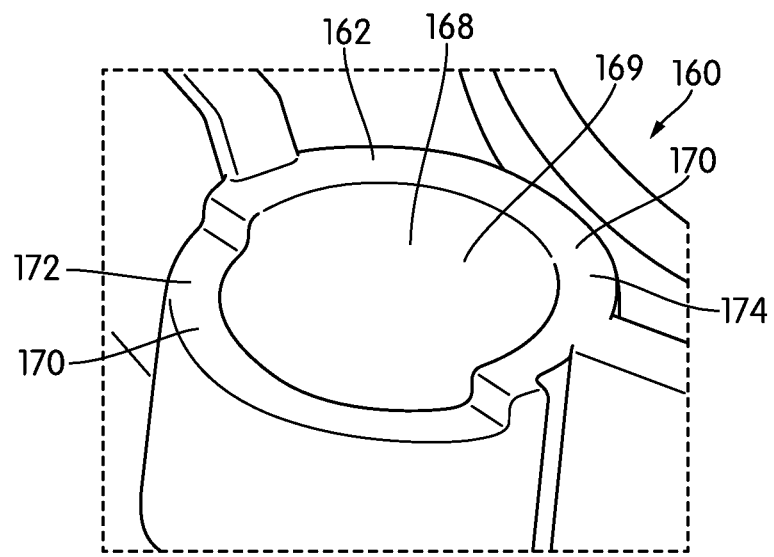
FIG. 7 is a perspective view of a drain port according to still another embodiment.
Figure 8:
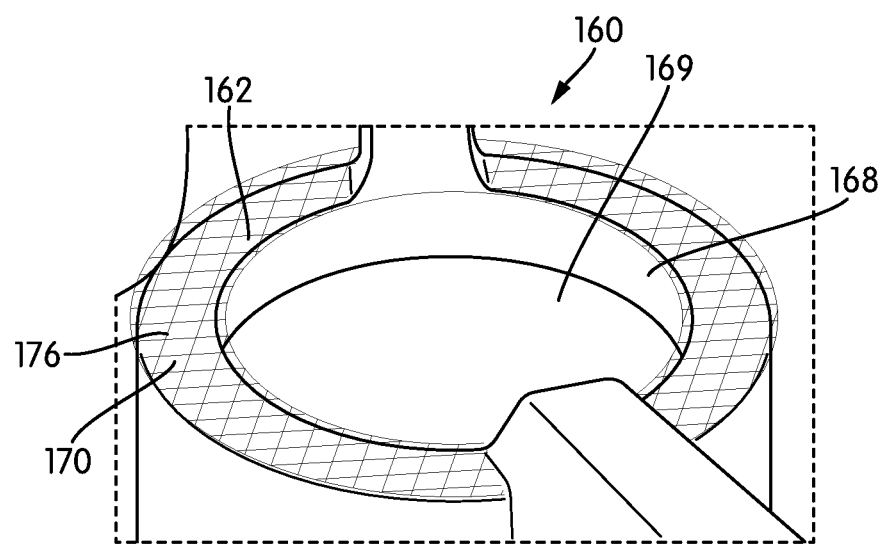
FIG. 8 is a perspective view of a drain port according to yet another embodiment.

Although it is understood that any combination of the surface modifications 170 may be used along the top portion 162 of the drain port 160, FIGS. 4-8 depict different configurations of the surface modifications 170 on the top portion 162. As shown in FIG. 4, the top portion 162 may include two notches 172 on either side of the top portion 162. As shown in FIG. 5, the top portion 162 may include two protrusions 174 on either side of the top portion 162. As shown in FIG. 6, the top portion 162 may include four protrusions 174 spaced along the circumference of the top portion 162 and four notches 172 in between each of the protrusions 174 along the top portion 162. As shown in FIG. 7, the top portion 162 may include a protrusion 174 that extends along approximately half of the circumference of the top portion 162 (e.g., a half-lip protrusion) and a notch 172 that extends along the remainder of the circumference of the top portion 162. As shown in FIG. 8, the top portion 162 may include surface texture or roughness 176 along the entire circumference (or a portion of the circumference) of the top portion 162. Accordingly, the various surface modifications 170 or combinations of surface modifications 170 may automatically prevent an unauthorized outlet port 130 that does not include the o-ring seal member 82 (and instead includes, for example, a face seal member 40) from securely and sealingly connecting to the top portion 162 of the drain port 160, thereby preventing a secure or effective sealed connection 50 therebetween.

The Outlet Port

The authorized outlet port 30 provides an area with an aperture 39 that fluid can flow through in order to drain from a filter assembly 20 (such as, for example, from the filter media 76 of the filter element 70). According to one embodiment, the outlet port 30 may allow fluid out of the filter element 30, into the drain port 160, and out of the housing 60. Accordingly, as shown in FIG. 3, the outlet port 30 is configured to align with the drain port 160 and create a seal with an area of the drain port 160 that does not include surface modifications 170, such as the inner surface 168 of the aperture 169 of the drain port 160. According to one embodiment, the outlet port 30 includes the o-ring seal member 82 to create a sealed connection 50 between the outlet port 30 and the drain port 160 (as described further herein). According to one embodiment, when the outlet port 30 and the drain port 160 are sealed together, the outlet port 30 may allow the fluid to flow from a portion of the filter assembly 20 through the outlet port 30 and into the drain port 160 (e.g., self-service draining) without any leakage. According to another embodiment, one of the drain port 160 and the outlet port 30 may be a plug and accordingly may plug the other of the drain port 160 and the outlet port 30 and prevent fluid flow through either one of the outlet port 30 and the drain port 160 and also prevent any fluid from leaking.

The outlet port 30 may optionally be a part of or integral with one of the top endplate 74 or the bottom endplate 74 of the filter element 70 or may be separately attached to a portion of the filter element 70, such as the filter media 76.

The outlet port 30 may include an end portion 31 that extends from a portion of the filter assembly 20 or filter element 70. The end portion 31 may include a lip or top surface 32 at the end of the outlet port 30, a side wall 38, and a side surface 34 of the side wall 38. The side wall 38 substantially surrounds an aperture 39 of the outlet port 30 (as shown, for example, in FIGS. 9-10) and may extend from a portion of the filter assembly 20. The side surface 34 is the outermost surface of the side wall 38.

According to one embodiment as shown in FIG. 3, the outlet port 30 may include a first lip 36 and optionally a second lip 38 that project outwardly beyond at least a portion of the side wall 38 and may help attach the o-ring seal member 82 to the outlet port 30. The first lip 36 and the second lip 38 may extend around a portion of or the entire outer circumference of the outlet port 30. The o-ring seal member 82 may be positioned between the first lip 36 and the second lip 38 such that the o-ring seal member 82 is secured along the length of the outlet port 30. The o-ring seal member 82 may also be attached to the outlet port 30 in a similar manner that the face seal members 40 may be attached to the unauthorized outlet ports 130, as described further herein.

The O-ring Seal Member

As shown in FIG. 3, the outlet port 30 may include a seal member, such as an o-ring seal member 82. The o-ring seal member 82 may be attachable to the end portion 31 of the outlet port 30 and thus may be configured to extend around the outer circumference or perimeter of the side surface 34 of the side wall 38 of the end portion 31 of the outlet port 30.

The o-ring seal member 82 may be sealable to a portion of the aperture 169 of the drain port 160 when the outlet port 30 and the drain port 160 are aligned. For example, the o-ring seal member 82 may seal to the inner surface 168 of the aperture 169 of the drain port 160 (as shown, for example, in FIG. 3). Accordingly, the o-ring seal member 82 of the outlet port 30 does not abut the top portion 162 or any surface modifications 170 that are on the top portion 162 of the drain port 160, thereby creating the complete sealed connection 50 between the outlet port 30 and the drain port 160.

Accordingly, the outer diameter of the o-ring seal member 82 (when attached to the outlet port 30) may be smaller than or approximately equal to the inner diameter of the drain port 160 (e.g., the diameter of the aperture 169) such that the outlet port 30 (with the o-ring seal member 82) can fit within and compress against the inner surface 168 of the aperture 169 of the drain port 160 in order to bridge or seal a gap between the side surface 34 of the outlet port 30 and the inner surface 168 of the aperture 169 of the drain port 160, thus creating the fully sealed connection 50. Thus, the top portion 162 or the surface modifications 170 of the drain port 160 may not abut or be directly attached or connected to the o-ring seal member 82 of the outlet port 30 when the outlet port 30 and the drain port 160 are sealingly connected to allow a completely sealed connection 50.

Accordingly, when the outlet port 30 and the drain port 160 are aligned and sealingly connected with each other, the o-ring seal member 82 of the outlet port 30 abuts and engages with the inner surface 168 of the aperture 169 of the drain port 160, which creates the sealed connection 50 between the outlet port 30 and the drain port 160 and prevents relative axial movement between the outlet port 30 and the drain port 160. Since the o-ring seal member 82 does not seal to the top portion 162 of the drain port 160 (which includes the surface modification(s) 170) and instead seals within the aperture 169 of the drain port 160, the outlet port 30 (with the o-ring seal member 82) may securely seal to the drain port 160, thereby preventing any leakage (either as fluid moves therebetween or as both the outlet port 30 and the drain port 160 are plugged), regardless of any surface modification 170.

The o-ring seal member 82 ensures that the outlet port 30 seals to the drain port 160, regardless of the configuration of the drain port 160. Accordingly, the drain port 160 may incorporate a variety of different surface modifications 170 (as described further herein) into the top portion 162 of the drain port 160.

The Unauthorized Outlet Port and the Face Seal Member

Figure 9:
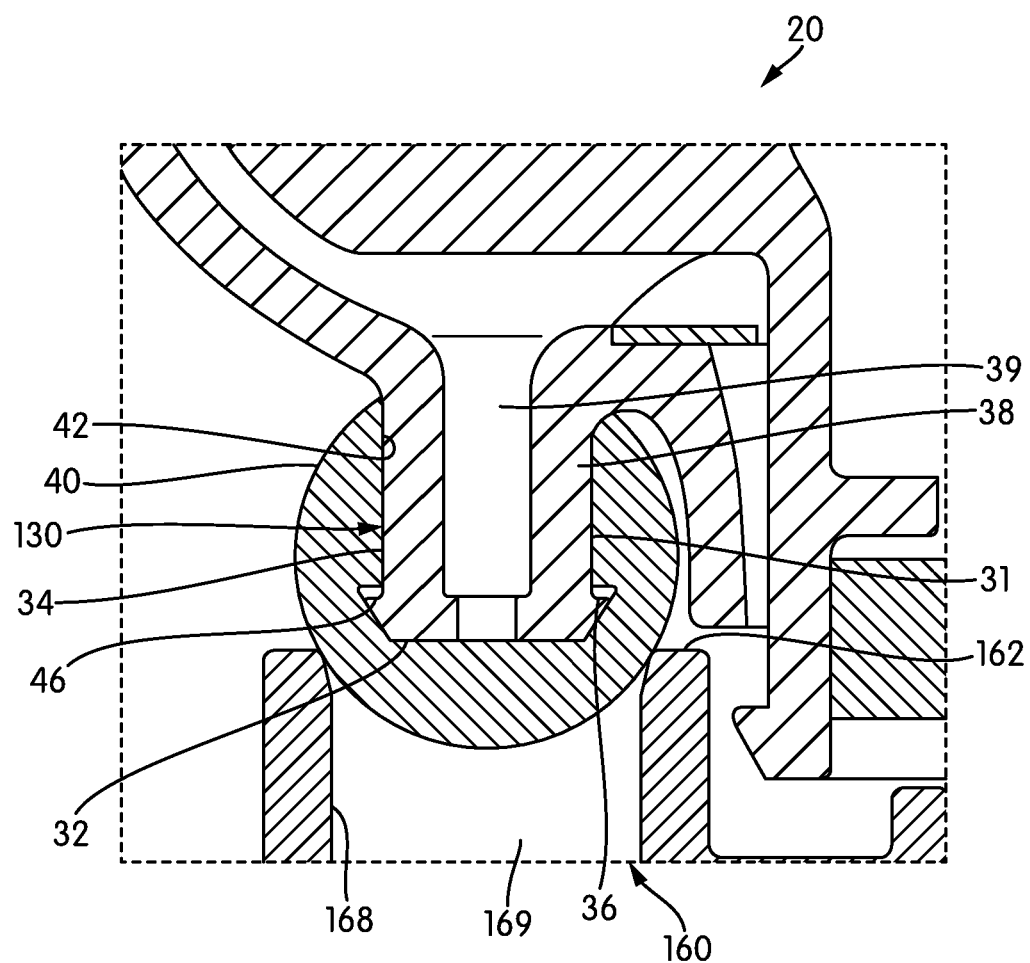
FIG. 9 is a cross-sectional view of a filter assembly according to another embodiment.
Figure 10:
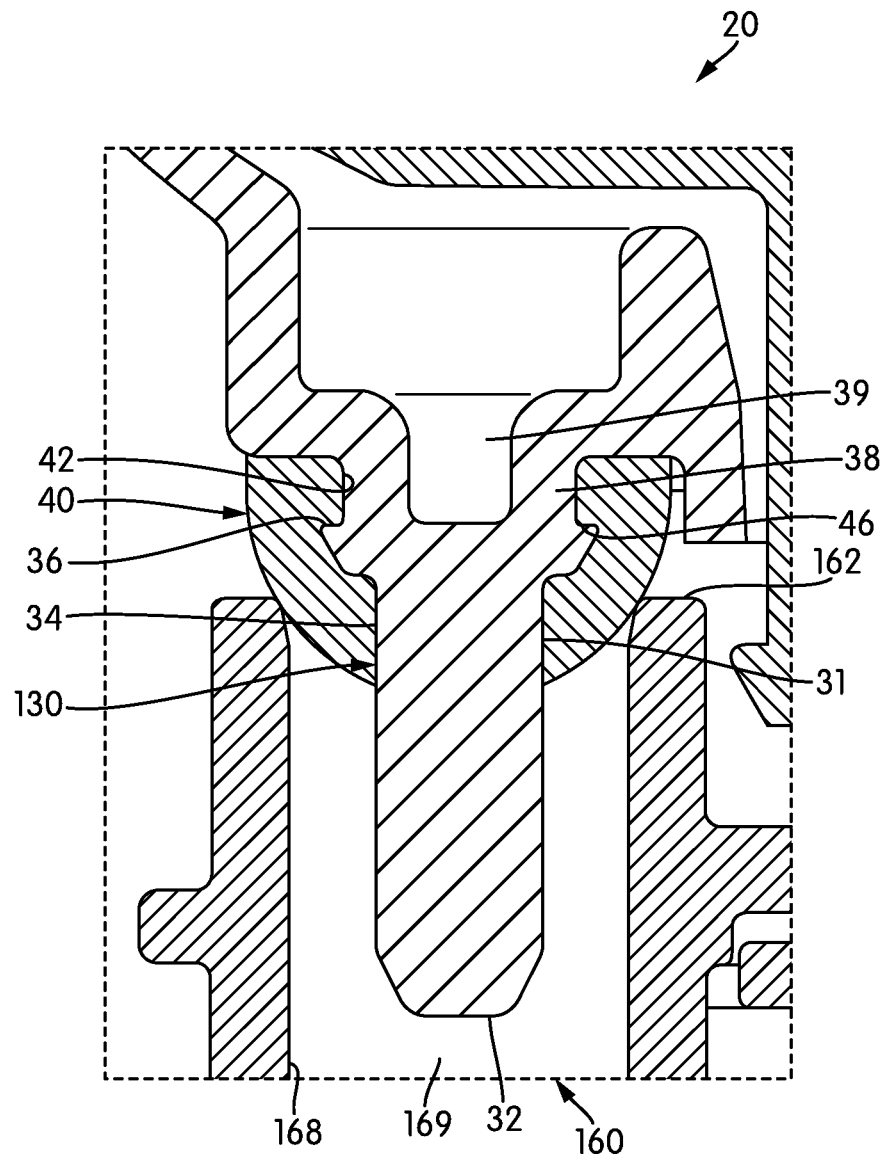
FIG. 10 is a cross-sectional view of a filter assembly according to yet another embodiment.
Figure 11:
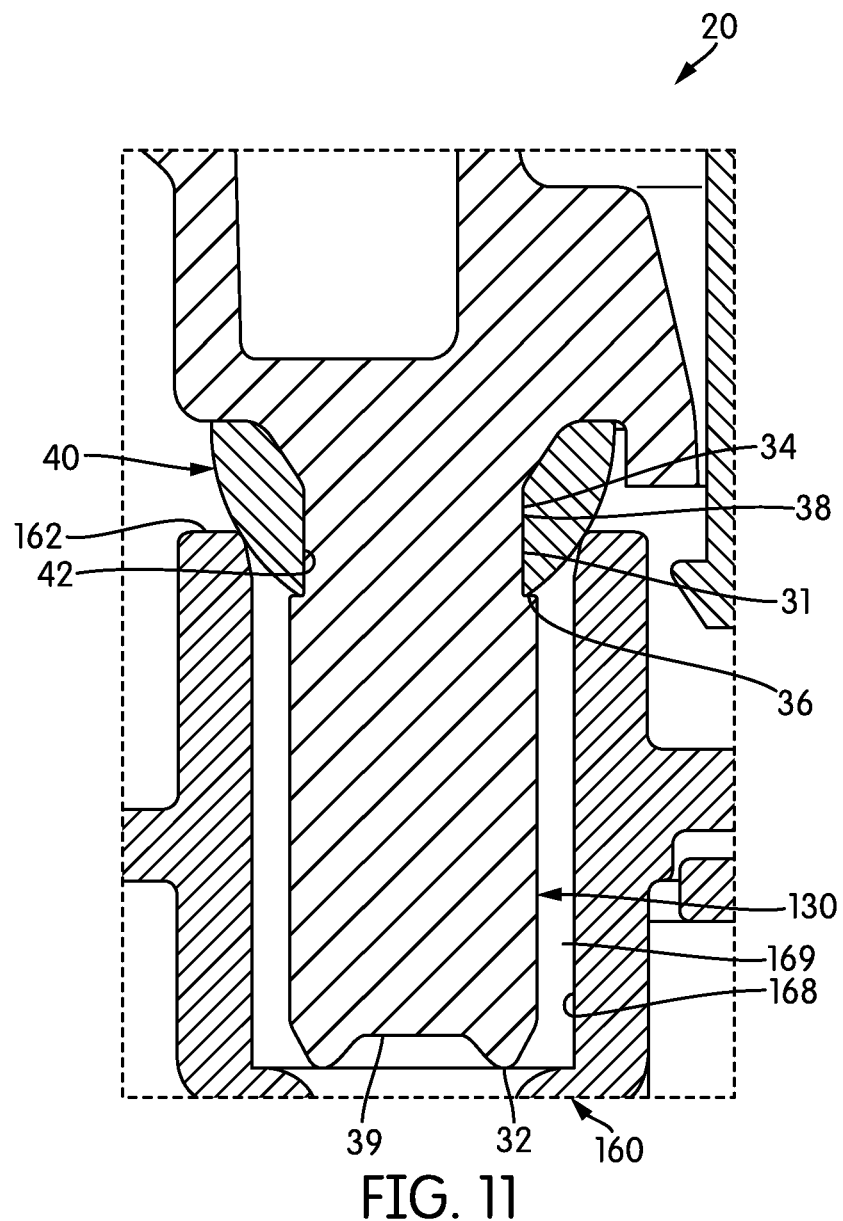
FIG. 11 is a cross-sectional view of a filter assembly according to still another embodiment.

The unauthorized outlet ports 130 cannot create a sealed connection with the drain port 160 due to the surface modifications 170 on the drain port. The unauthorized outlet ports 130 do not seal to the portion of the drain port 160 that does not have the surface modifications 170. For example, the unauthorized outlet ports 130 do not seal to the inner surface 168 of the aperture 169 of the drain port 160 and do not have the o-ring seal member 82. Instead, according to one configuration of a filter assembly as shown in FIGS. 9-11, the unauthorized outlet port 130 may include a seal member that is a face seal member 40. The surface modifications 170 on the drain port 160 are configured to abut the face seal member 40 on the unauthorized outlet port 130, thereby preventing a seal connection between the drain port 160 and the unauthorized outlet port 130. The face seal member 40 may be positioned on or attached to an end portion 31 of the unauthorized outlet port 130 and/or at least a portion of the side surface 34 of the side wall 36 of the unauthorized outlet port 130.

According to one embodiment as shown in FIGS. 9-11, the unauthorized outlet port 130 may include a lip 36 that projects outwardly beyond at least a portion of the side wall 38 and may help attach the face seal member 40 to the unauthorized outlet port 130. The lip 36 may extend around a portion of or the entire outer circumference of the unauthorized outlet port 130. According to the embodiment shown in FIGS. 9 and 10, the lip 36 provides an attachment area that protrudes into the face seal member 40 for the face seal member 40 to securely attach to the unauthorized outlet port 130, as described further herein. According to another embodiment as shown in FIG. 11, the face seal member 40 is sandwiched between the lip 36 and a base of the unauthorized outlet port 130 for the face seal member 40 to securely attach to the unauthorized outlet port 130. The face seal members 40 may also be attached to the unauthorized outlet ports 130 in a similar manner that the o-ring seal member 82 may be attached to the outlet port 30, as described further herein.

According to one embodiment as shown in FIG. 9, the face seal member 40 may extend along at least a portion of the top surface 32 of the end portion 31 of the unauthorized outlet port 130. According to another embodiment as shown in FIGS. 10-11, the unauthorized outlet port 130 may extend completely through the aperture 42 of the face seal member 40.

According to one embodiment, the face seal member 40 may have a diameter that is greater than the inner diameter of the end of the drain port 160 (e.g., the diameter of the aperture 169). Accordingly, the face seal member 40 of the unauthorized outlet port 130 may not completely fit or extend within the aperture 169 of the drain port 160 and instead abuts the top portion 162 of the drain port 160. Since the top portion 162 includes surface modifications 170, the surface modifications 170 disrupt or prevent any seal between the face seal member 40 of the unauthorized outlet port 130 and the top portion 162 of the drain port 160 by creating at least one gap between the face seal member 40 and the top portion 162, which results in leakage and prevents a sealed connection 50. Accordingly, the surface modifications 170 on the drain port 160 may prevent the use of an unauthorized filter element 70 with an unauthorized outlet port 130 (that may include a face seal member 40) with a housing 60 with the drain port 160.

The face seal member 40 may be shaped like a ball or sphere with an aperture and may be substantially cylindrical (having a circular cross-section, as shown in FIG. 9). Alternatively, the face seal member 40 may be a hemisphere (having a hemisphere cross-section, as shown in FIGS. 10-11), or the cross section of the face seal member 40 may have more of an oval cross-section. Still other cross-sections are also possible. The face seal member 40 may include an aperture 42 extending at least partially through the face seal member 40. The face seal member 40 may be positioned over the end portion 31 of the unauthorized outlet port 130 such that the unauthorized outlet port 130 extends at least partially through or into the aperture 42. Accordingly, as shown in FIG. 9, the aperture 39 of the unauthorized outlet port 130 and the aperture 42 of the face seal member 40 are longitudinally aligned and share a common center axis.

According to one embodiment as shown in FIGS. 10-11, the aperture 42 may extend through the face seal member 40 to allow fluid to drain or move between the unauthorized outlet port 130 (and thus through the face seal member 40). Optionally, the unauthorized outlet port 130 may extend completely through the aperture 42 such that the aperture 39 of the unauthorized outlet port 130 and the aperture 42 of the face seal member 40 are concentric. According to another embodiment, the aperture 42 may not extend all the way through the face seal member 40 (and accordingly, the unauthorized outlet port 130 does not extend completely through the aperture 42) in order to plug or close off both the unauthorized outlet port 130 and prevent fluid flow through the unauthorized outlet port 130.

According to one embodiment as shown in FIGS. 9-10, the face seal member 40 may include a crevice 46 along an inner surface of the aperture 42. Accordingly, the lip 36 of the unauthorized outlet port 130 may extend and lock into the crevice 46 when the face seal member 40 is attached to the unauthorized outlet port 130, thereby securely attaching the face seal member 40 to the unauthorized outlet port 130.

The face seal member 40 may be constructed out of a variety of different materials, including flexible plastics or rubber.

It is understood that the various aspects, components, and configurations of the outlet port 30 and the unauthorized outlet port 130 may be used interchangeably, with the exception that the outlet port 30 seals to portions of the drain port 160 without the surface modifications 170 and that the unauthorized outlet port 130 does not seal to the portions of the drain port 160 without the surface modifications 170.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. Additionally, it should also be understood that features disclosed in different embodiments may be combined into yet further embodiments not necessarily depicted or described herein. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter housing assembly, comprising:
a filter housing; and
a drain port operatively connected to the filter housing, the drain port including a top portion that comprises at least one surface modification such that an upper surface of the top portion extends to at least two different axial positions along a circumference of the top portion,
the drain port comprising an inner surface that defines an aperture, the aperture extending through the drain port,
the drain port being alignable and sealingly connectable with an outlet port of a filter element, the outlet port including a seal member attachable to an end portion of the outlet port,
a portion of the aperture of the drain port being sealable to the seal member of the outlet port when the drain port and the outlet port of the filter element are aligned such that the at least one surface modification of the drain port does not abut the seal member of the outlet port, thereby creating a sealed connection between the drain port and the outlet port,
wherein the inner surface of the drain port that defines the aperture is sealable to the seal member of the outlet port such that the seal member seals within the aperture.

2. The filter housing assembly of claim 1, wherein the seal member is an o-ring seal member that extends around an outer circumference of the end portion of the outlet port.

3. The filter housing assembly of claim 1, wherein the at least one surface modification prevents an unauthorized outlet port from sealing to the top portion of the drain port, wherein the unauthorized outlet port does not seal with portions of the drain port without the at least one surface modification.

4. The filter housing assembly of claim 1, wherein the at least one surface modification includes at least one of a notch, protrusion, groove, cut, and surface roughness.

5. The filter housing assembly of claim 1, wherein one of the drain port and the outlet port extends into the other of the drain port and the outlet port when the drain port and the outlet port are sealingly connected to each other.

6. The filter housing assembly of claim 1, wherein the outlet port extends into the aperture of the drain port when the drain port and the outlet port are sealingly connected to each other.

7. A filter assembly, comprising:
a first port including a top portion that comprises at least one surface modification such that an upper surface of the top portion extends to at least two different axial positions along a circumference of the top portion,
the first port comprising an inner surface that defines an aperture, the aperture extending through the first port; and
a second port including a seal member and an end portion, the seal member being attachable to an end portion of the second port,
the first port and the second port being alignable and sealingly connectable with each other,
a portion of the aperture of the first port forming a seal with the seal member of the second port when the first port and the second port are aligned such that the at least one surface modification of the first port does not abut the seal member of the second port, thereby creating a sealed connection between the first port and the second port,
wherein the inner surface of the first port that defines the aperture forms a seal with the seal member of the second port such that the seal member seals within the aperture.

8. The filter assembly of claim 7, wherein the seal member of the second port does not seal with the top portion of the first port.

9. The filter assembly of claim 7, wherein the at least one surface modification prevents an unauthorized second port from sealing to the top portion of the first port, wherein the unauthorized second port does not seal with portions of the first port without the at least one surface modification.

10. The filter assembly of claim 9, wherein the unauthorized second port includes a face seal member that abuts the top portion of the first port when the first port and the unauthorized second port are aligned with each other.

11. The filter assembly of claim 10, wherein, when the unauthorized second port with the face seal member is aligned with the first port, the at least one surface modification creates at least one gap between the top portion of the first port and the face seal member on the unauthorized second port.

12. The filter assembly of claim 9, wherein the unauthorized second port does not include the seal member.

13. The filter assembly of claim 7, wherein the outer diameter of the second port is smaller than the inner diameter of the aperture of the first port such that the second port fits at least partially within the aperture of the first port.

14. The filter assembly of claim 7, wherein the second port includes an aperture for fluid flow and, when the first port and the second port are sealed together, fluid can flow between the first port and the second port without leakage.

15. The filter assembly of claim 7, wherein the sealed connection between the first port and the second port prevents relative axial movement between the first port and the second port.

16. The filter assembly of claim 7, wherein the second port is plug such that, when the first port and the second port are sealed together, fluid cannot flow between the first port and the second port and the fluid does not leak from between the first port and the second port.

17. The filter assembly of claim 7, wherein the first port is a drain port and the second port is an outlet port.

18. A filter assembly comprising:
a housing, the housing including a drain port including a top portion that comprises at least one surface modification such that an upper surface of the top portion extends to at least two different axial positions along a circumference of the top portion,
the drain port comprising an inner surface that defines an aperture, the aperture extending through the drain port; and
a filter element positionable within the housing and including a filter media and an outlet port, the outlet port including a seal member and an end portion, the seal member being attachable to the end portion of the outlet port, the drain port and the outlet port being alignable and sealingly connectable with each other,
wherein a portion of the aperture of the drain port is sealable to the seal member of the outlet port when the drain port and the outlet port are aligned such that the at least one surface modification of the drain port does not abut the seal member of the outlet port, thereby creating a sealed connection between the drain port and the outlet port, wherein the inner surface of the drain port that defines the aperture is sealable to the seal member of the outlet port such that the seal member seals within the aperture.

19. The filter assembly of claim 18, wherein the at least one surface modification prevents an unauthorized outlet port from sealing to the top portion of the drain port, wherein the unauthorized outlet port does not seal with portions of the drain port without the at least one surface modification.

20. The filter housing assembly of claim 1, wherein the at least one surface modification comprises a protrusion that extends from one portion of the circumference of the top portion.

21. The filter housing assembly of claim 1, wherein the at least one surface modification comprises two protrusions that are spaced apart from each other about the circumference of the top portion.

* * * * *